3,406,143
LIGHT STABLE ALKENYL AROMATIC RESINS

Charles L. Stacy, Jr., William J. Hanson, and Theodore C. Wallace, Midland, Mich., assignors to The Dow Chemical Company, Midland, Mich., a corporation of Delaware
No Drawing. Filed Feb. 26, 1964, Ser. No. 347,368
1 Claim. (Cl. 260—45.8)

ABSTRACT OF THE DISCLOSURE

The compositions are of the class of light stable alkenyl aromatic resins containing a light stabilizing mixture of an ultraviolet light absorber, a phenolic antioxidant and a phosphite antioxidant, useful for fabricating into light fixtures.

---

This invention relates to resins having improved resistance to deterioration by actinic energy. More particularly the invention relates to resins of alkenyl aromatic compounds which exhibit decreased yellowing following prolonged exposure to light having at least a portion of its energy in the ultraviolet range.

Thermoplastic resins such as polystyrene are easily fabricated into light fixtures which are both decorative and useful as light diffusers, however these resins are unsuitable for light fixtures which will be exposed to ultraviolet light such as that produced by fluorescent lamps having ultraviolet radiation in the region between 3,000 and 4,000 Angstroms. The resins become yellow after a period of time, increasing the amount of light which is absorbed and decreasing the amount transmitted or reflected. This is a particularly severe problem with fluorescent light diffusers and has, to a large extent, been responsible for the reluctance of the light fixture manufacturers to make these parts from resins.

In addition to the effect of light on these resins, yellowing occurs when the resin is subjected to an elevated temperature. Some discoloration may develop when the thermoplastic resin is molded at a temperature above the melting point of the resin. Some of the molded resin may be salvaged and the resin remolded. This second processing at high temperature is particularly apt to result in an undesirable yellow color.

These resins have been formulated with various antioxidants and ultraviolet absorbers which have the ability to retard their yellowing. These agents effectively extend the useful life of the resins, however yellowing ultimately occurs and the members must be replaced to maintain efficient illumination.

We have discovered a combination of agents which greatly extend the useful life of lighting fixtures made of alkenyl aromatic resins. Resins containing these agents have been found to have much more resistance to yellowing than formulations previously known and used. Additionally, these agents produce crystal-clear, colorless resins which can be reprocessed without an appreciable change in physical properties and with no more than a slight increase in color.

This improved resin stability is obtained by adding to the resin a minor amount of a mixture consisting of an ultraviolet light absorber, a phenolic antioxidant and a phosphite antioxidant.

These agents may be used to stabilize alkylene aromatic resins such as the homopolymers and copolymers of styrene, vinyl toluene, vinyl xylene, ethyl vinylbenzene, isopropyl styrene, p-tert.-butylstyrene, chlorostyrene and dichlorostyrene, as well as copolymers of these alkenyl aromatic compounds and aliphatic vinylidene compounds such as acrylonitrile, methyl methacrylate and maleic anhydride.

The stabilizing agents are blended with the resin and fed to an extruder in proportions which provide the desired concentration in the resin. Uniform mixing sometimes may be obtained more easily if the agents are first mixed with resin at a high concentration then this mixture is blended with additional resin to produce a resin having the desired concentration of stabilizing agents.

Resins have improved stability to light when they contain from about 0.03 to about 10 percent by weight of an ultraviolet light absorber in combination with about 0.03 to about 2.0 weight percent of each of the phenolic antioxidant and the phosphite antioxidant. Some of the resins have a greater tendency than others to become discolored. For example, a polystyrene resin stabilized with about 0.2 percent of the ultraviolet absorber and 0.05 percent of each of the antioxidants has a light stability comparable with that of a high impact type of polystyrene resin containing a substantially higher concentration of the stabilizing agents.

Numerous ultraviolet absorbers are available for stabilizing resins. Agents which may be used according to this invention are the triazoles, benzophenones, and salicylates such as: 2-(2'-hydroxy-5'-methylphenyl)benzotriazole; 2 - (2'-hydroxy-3',5'-dimethylphenyl)benzotriazole; 2-hydroxy-4-octyloxybenzophenone; 2-hydroxy-4,4'-dimethoxybenzophenone and phenyl salicylate.

Phenolic antioxidants which may be used in combination with the ultraviolet absorbers include: 4,4'-cyclohexylidenebis(2 - cyclohexylphenol); 2,6 - di-tert.-butyl paracresol; 2,2' - methylenebis(4 - ethyl - 6-tert.-butylphenol); 4,4'-thiobis(3-methyl-6-tert.-butylphenol) and 2,2'-thiobis(4-tert.-octylphenol).

The phosphite antioxidants which may be used are the trialkyl phosphites wherein the alkyl groups contain from about 4 to about 18 carbon atoms, e.g., tributylphosphite, tridecylphosphite and trioctadecylphosphite.

A method which has been used to stabilize a resin with this 3-component mixture of agents involved the preparation of a concentrate with 85 parts by weight of an extrusion grade polystyrene. The polystyrene was first blended with 2.5 parts by weight of tridecylphosphite then 10 parts by weight of 2-(2',hydroxy5ı-methylphenyl)benzotriazole and 2.5 parts by weight of 4,4'-cyclohexylidenebis(2-cyclohexylphenol) were added and the mixture blended until uniform. This mixture was then combined with additional polystyrene and fed to an extruder in the proportion of 20 parts by weght of the mixture to 980 parts by weight of resin, producing 1,000 parts by weight of stabilized resin having the following composition:

| | Percent |
|---|---|
| Polystyrene | 99.7 |
| 2-(2'-hydroxy-5'-methylphenyl)benzotriazole | 0.2 |
| Tridecylphosphite | 0.05 |
| 4,4'-cyclohexylidene bis(2-cyclohexylphenol) | 0.05 |

Samples of this stabilized resin were placed in direct contact with a Black Light for 1,000 hours to produce yellowing at an accelerated rate. The yellowness numbers of the samples were then determined by measuring the difference in reflection at wave lengths of 620 and 420. Samples of the above stabilized resin had an average yellowness number of 16.8 whereas the same extrusion grade polystyrene without any stabilizers had a yellowness number of 49.9. Polystyrene containing only 0.2 percent of the ultraviolet absorber 2-(2'-hydroxy-5'-methylphenyl)benzotriazole and no antioxidants had a yellowness number of 30.8.

We claim:
1. A light stable resin comprising polystyrene containing between 0.03 and 10.0 weight percent of 2-(2'-hydroxy - 5' - methylphenyl)benzotriazole and between about 0.03 and 2.0 weight percent each of 4,4'-cyclohexylidene bis(2-cyclohexylphenol) and tridecylphosphite.

References Cited

UNITED STATES PATENTS

| | | | |
|---|---|---|---|
| 2,857,360 | 10/1958 | Feuer | 260—45.85 X |
| 3,039,993 | 6/1962 | Friedman | 260—45.8 |
| 3,061,584 | 10/1962 | Raley | 260—45.8 |
| 3,072,585 | 1/1963 | Milionis et al. | 260—45.95 X |
| 3,131,164 | 3/1964 | Doyle et al. | 260—45.8 |
| 3,134,748 | 5/1964 | Costello et al. | 260—45.8 |

DONALD E. CZAJA, *Primary Examiner.*

M. J. WELSH, *Assistant Examiner.*